US011462071B2

(12) United States Patent
Yamazaki et al.

(10) Patent No.: US 11,462,071 B2
(45) Date of Patent: Oct. 4, 2022

(54) SYSTEM AND METHOD TO PURCHASE FROM A VENDING MACHINE BY USING A MOBILE PHONE

(71) Applicant: The Coca-Cola Company, Atlanta, GA (US)

(72) Inventors: Yasuhiro Yamazaki, Atlanta, GA (US); Tatsuya Sugawara, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/088,424

(22) PCT Filed: Mar. 23, 2017

(86) PCT No.: PCT/US2017/023833
§ 371 (c)(1),
(2) Date: Sep. 25, 2018

(87) PCT Pub. No.: WO2017/165658
PCT Pub. Date: Sep. 28, 2017

(65) Prior Publication Data
US 2019/0108709 A1   Apr. 11, 2019

(30) Foreign Application Priority Data

Mar. 25, 2016 (JP) .............................. JP2016-062230

(51) Int. Cl.
*G07F 9/00* (2006.01)
*G06Q 20/18* (2012.01)
(Continued)

(52) U.S. Cl.
CPC ............. *G07F 9/001* (2020.05); *G06Q 20/18* (2013.01); *G06Q 20/322* (2013.01);
(Continued)

(58) Field of Classification Search
CPC ........ G07F 11/002; G07F 9/001; G07F 9/023; G07F 13/065; G06Q 20/18; G06Q 20/322; G06Q 2220/00
See application file for complete search history.

(56) References Cited

U.S. PATENT DOCUMENTS 7,762,181 B2    7/2010  Boland et al.
8,340,815 B2 *  12/2012 Peters ..................... G07F 9/002
                                                           700/236

(Continued)

FOREIGN PATENT DOCUMENTS

JP    H10228572 A    8/1998
JP    2002352307 A   12/2002
(Continued)

OTHER PUBLICATIONS

International Search Report and Written Opinion regarding PCT Application No. PCT/US2017/023833, dated Jun. 5, 2017, 8 pages.
(Continued)

*Primary Examiner* — Timothy R Waggoner
(74) *Attorney, Agent, or Firm* — Foley & Lardner LLP

(57) ABSTRACT

A food/drink dispensing device that manages a connection with a mobile terminal may include a connection unit for specifying a mobile terminal to connect with and for establishing a connection with the specified mobile terminal. A transmission unit may be configured to send, to the mobile terminal, device identification information for identifying the food/drink dispensing device, type information relating to the types of food/drink handled by the food/drink dispensing device, and status information relating to the food/drink. A determination unit may be configured to determine whether or not the food/drink can be dispensed when dispensing designation information with respect to food/drink of the type selected has been received from the mobile
(Continued)

terminal. A dispensing unit may be configured to dispense the food/drink when dispensing of said food/drink is possible.

19 Claims, 14 Drawing Sheets

(51) Int. Cl.
    *G06Q 20/32*     (2012.01)
    *G07F 13/06*     (2006.01)
    *H04M 1/72406*     (2021.01)
    *H04M 1/72415*     (2021.01)
    *G07F 9/02*     (2006.01)
    *G07F 7/00*     (2006.01)
    *H04W 12/03*     (2021.01)
    *H04W 12/06*     (2021.01)

(52) U.S. Cl.
    CPC ............ *G06Q 20/327* (2013.01); *G07F 7/00* (2013.01); *G07F 9/002* (2020.05); *G07F 9/023* (2013.01); *G07F 13/065* (2013.01); *H04M 1/72406* (2021.01); *H04M 1/72415* (2021.01); *G06Q 2220/00* (2013.01); *H04W 12/03* (2021.01); *H04W 12/06* (2013.01)

(56) References Cited

U.S. PATENT DOCUMENTS

| | | | |
|---|---|---|---|
| 8,473,864 B2* | 6/2013 | Segal | G06F 3/0488 715/764 |
| 8,781,622 B2* | 7/2014 | Mockus | G06Q 20/18 700/237 |
| 9,240,007 B2* | 1/2016 | Barragan | G06Q 20/322 |
| 9,262,771 B1 | 2/2016 | Patel | |
| 9,898,884 B1* | 2/2018 | Arora | G07F 11/002 |
| 2007/0050083 A1 | 3/2007 | Signorelli et al. | |
| 2008/0313028 A1* | 12/2008 | Williams | G07F 9/02 705/14.27 |
| 2009/0125429 A1* | 5/2009 | Takayama | G06Q 20/04 705/35 |
| 2010/0030355 A1 | 2/2010 | Insolia et al. | |
| 2010/0045705 A1* | 2/2010 | Vertegaal | G06F 3/0346 345/661 |
| 2010/0125362 A1 | 5/2010 | Canora et al. | |
| 2012/0240781 A1* | 9/2012 | Delbreil | G07F 9/02 99/285 |
| 2014/0032413 A1 | 1/2014 | Low et al. | |
| 2015/0039776 A1 | 2/2015 | Jarnagin, III | |
| 2015/0082243 A1* | 3/2015 | Taylor | G06F 3/0485 715/814 |
| 2015/0100152 A1 | 4/2015 | Barragan Trevino et al. | |
| 2015/0144650 A1* | 5/2015 | Kline | G06Q 30/0259 222/1 |
| 2015/0144653 A1* | 5/2015 | Kline | B67D 1/0888 222/1 |
| 2015/0170130 A1 | 6/2015 | Patel et al. | |
| 2016/0027132 A1 | 1/2016 | Craparo et al. | |
| 2017/0238753 A1* | 8/2017 | Merali | A47J 31/52 |

FOREIGN PATENT DOCUMENTS

| | | |
|---|---|---|
| JP | 2003151014 A | 5/2003 |
| JP | 2006004243 A | 1/2006 |
| JP | 2009042885 A | 2/2009 |
| JP | 2013117845 A | 6/2013 |
| JP | 2015072621 A | 4/2015 |
| WO | 2015/016709 A1 | 2/2015 |

OTHER PUBLICATIONS

Extended European Search Report regarding Europe Application No. 17771160.3, dated Jul. 25, 2019, 8 pages.
Japanese Office Action regarding Japan Application No. 2016-062230, dated Jul. 16, 2019, 6 pages.
Foreign Action other than Search Report on EP 17771160.3, dated Dec. 9, 2020, 7 pages.
Chinese Patent Appl. No. 2017800314867, Second Office Action dated Mar. 4, 2022, 25 pgs.

* cited by examiner

FIG. 3

| User ID | Attribute information | | | Purchase history |
|---|---|---|---|---|
| | Gender | Age | ... | |
| AAAAA | Male | 25 | ... | 20150315 Product P<br>20150425 Product Q<br>⋮ |
| BBBB | Female | 19 | ... | 20150326 Product P<br>20150425 Product Q<br>⋮ |
| ⋮ | ⋮ | | | ⋮ |

FIG. 4

| Device ID | Location of installation | Machine type |
|---|---|---|
| I-xxxxxxx | (xxxxx,yyyy) | Can vending machine |
| I-yyyyyyy | (ZZZZZZ,XXXXXx) | Food vending machine |
| C-PPPPP | (kkkkkkk,mmmmmm) | Dispenser |
| ⋮ | ⋮ | ⋮ |

FIG. 5

| Product image ID | Product code | Region | Time | User attributes |
|---|---|---|---|---|
| 1111.Jpg | 12345 | Kansai region | April-June 2016 | 20s, male |
| 2222.Jpg | 88888 | Tokyo, Minato Ward | — | — |
| 33333.jpg | 223651 | Tokyo, all regions | 2016 | 30s, female |
| . | . | . | . | . |
| . | . | . | . | . |
| . | . | . | . | . |

FIG. 6

| Manager code (product code) | Company code |
|---|---|
| 12345 | ABCDE |
| 88888 | FGHIJ |
| 223651 | ZZZZXX |
| . . . | . . . |

SYSTEM AND METHOD TO PURCHASE FROM A VENDING MACHINE BY USING A MOBILE PHONE

REFERENCE TO RELATED APPLICATION

This application claims the benefit of International Patent Application No. PCT/US2017/023833, which was filed on Mar. 23, 2017, which claims the benefit of Japanese Application No. 2016062230, which was filed on Mar. 25, 2016, which is herein incorporated by reference in its entirety.

TECHNICAL FIELD

The present invention relates to a food/drink dispensing device, and to a mobile terminal configured to communicate therewith.

BACKGROUND OF THE INVENTION

Food/drink dispensing devices, such as vending machines, that communicate with a mobile terminal are becoming more widespread.

JP 2015-153301 A (Patent Document 1) describes technology for easily ascertaining whether or not a vending machine is able to wirelessly communicate. The vending machine described in Patent Document 1 sells products in accordance with pressing of a button having a light-emitting element. This vending machine comprises a terminal detection unit for detecting a mobile terminal able to wirelessly communicate, and a light-emission controller for causing the light-emitting element to emit light when a mobile terminal able to wirelessly communicate has been detected.

In the system described in Patent Document 1, a user of a mobile terminal connected to the vending machine can only designate a product to purchase from the vending machine by selecting a button on said vending machine.

SUMMARY OF THE INVENTION

To overcome existing limitations, one embodiment enables designation of food/drink to be dispensed by means of a mobile terminal connected to a food/drink dispensing device, such as a vending machine.

A food/drink dispensing device may manage a connection with a mobile terminal and comprises: a connection unit for specifying a mobile terminal to connect with and for establishing a connection with the specified mobile terminal; a transmission unit for sending, to the mobile terminal, device identification information for identifying the food/drink dispensing device, type information relating to the types of food/drink handled by the food/drink dispensing device, and status information relating to the food/drink; a determination unit for determining whether or not the food/drink can be dispensed, when dispensing designation information with respect to food/drink of the type selected has been received from the mobile terminal; and a dispensing unit for dispensing said food/drink when dispensing of said food/drink is possible.

In an embodiment, it is possible to designate food/drink to be dispensed by means of a mobile terminal connected to a food/drink dispensing device, such as a vending machine.

BRIEF DESCRIPTION OF THE DRAWINGS

Illustrative embodiments of the present invention are described in detail below with reference to the attached drawing figures, which are incorporated by reference herein and wherein:

FIG. 3 illustrates an example of a user information DB according to a first mode of embodiment;

FIG. 4 illustrates an example of a device information DB according to a first mode of embodiment;

FIG. 5 illustrates an example of an image information DB according to a first mode of embodiment;

FIG. 6 illustrates an example of a code conversion table according to a first mode of embodiment;

DETAILED DESCRIPTION OF THE INVENTION

Mode of Embodiment of the Invention

Figure 1:
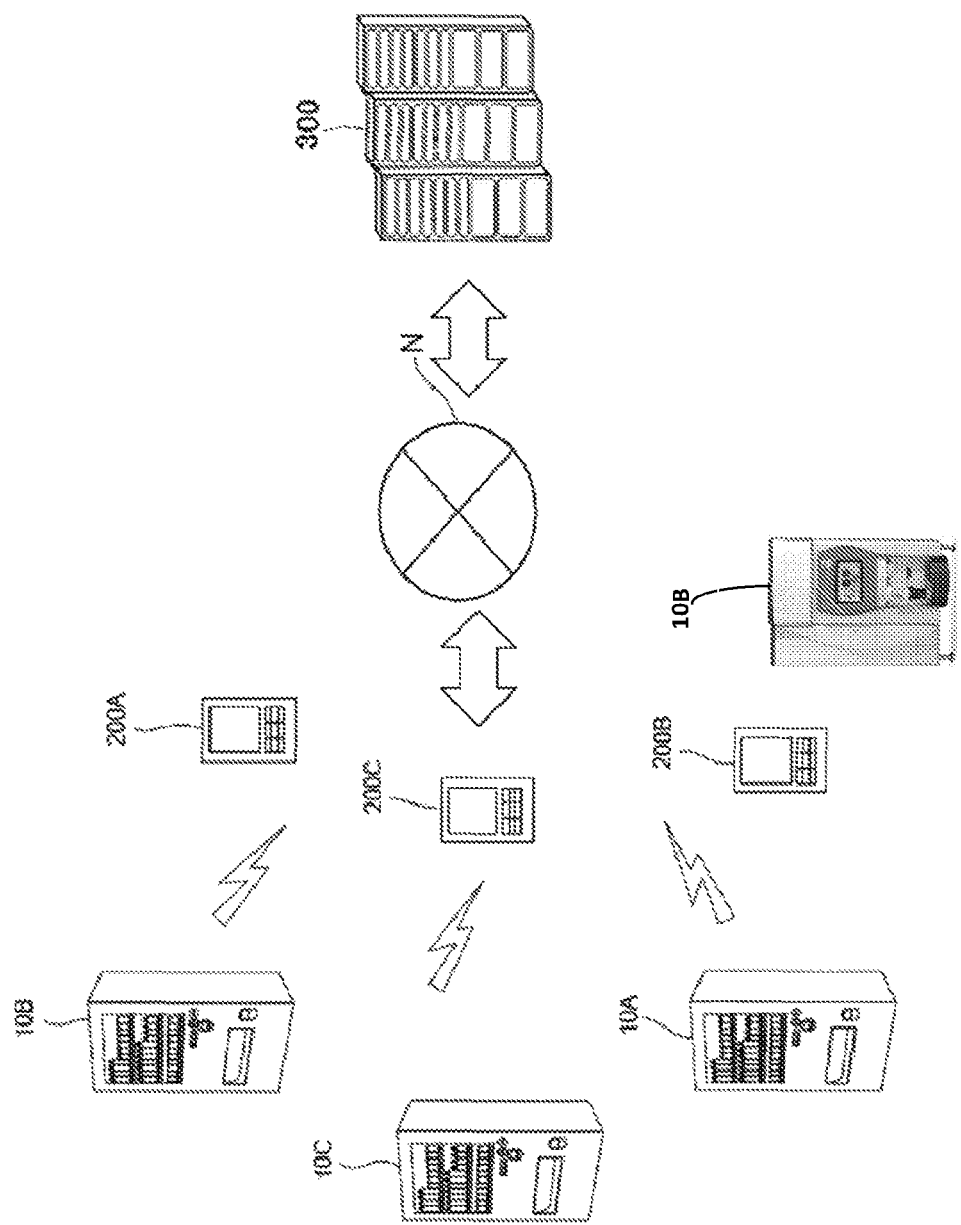
FIG. 1 is a configuration diagram of a connection management system according to a first mode of embodiment.

A mode of embodiment of the present invention is described in detail below. It should be noted that the following mode of embodiment is an example serving to illustrate one embodiment, and is not intended to limit the present invention to this mode of embodiment alone. Furthermore, a number of variants are possible provided that any such variants do not depart from the scope of the present invention. In addition, a person skilled in the art may employ modes of embodiment in which the elements described below are substituted with equivalent elements, and any such modes of embodiment are also included in the scope of the present invention. Furthermore, the positional relationships, such as above/below, left/right, etc., which are indicated where necessary are based on the positional relationships illustrated in the drawings unless specifically indicated otherwise. In addition, the dimensional proportions of the various constituent elements in the modes of embodiment are not limited to the dimensional proportions illustrated.

First Mode of Embodiment

1. Outline of the System

FIG. 1 illustrates the configuration of a connection management system 1 according to this mode of embodiment.

The connection management system 1 is a system for connecting to a food/drink dispensing device using a mobile terminal and for purchasing a product. The following description may be given using a vending machine for vending canned drinks (also referred to below simply as a "vending machine") as an example of a food/drink dispensing device, but the food/drink dispensing device is not limited to a vending machine. The food/drink dispensing device may equally be a vending machine for vending cupped beverages, a dispenser, or a food vending machine for vending sweets and instant foods, etc.

As illustrated in FIG. 1, in the connection management system 1, a plurality of vending machines and/or dispensers 10A-10D (the vending machines and/or dispensers 10A-10D are referred to collectively below as "the vending machine(s) 10") and mobile terminals 200A-200C (the mobile terminals 200A-200C are referred to collectively below as "the mobile terminal(s) 200") are directly connected by means of P2P (peer-to-peer) communication or the like, and the mobile terminal 200 and a management server 300 are connected together via a network N. As understood in the art, vending machines primarily refer to the vending of prepackaged foods/beverages, whereas dispensers generally refer to foods/beverages that are created by a user or machine at the dispenser. Although not shown, coolers or other machines may also be included in the devices to which a mobile device may connect, as discussed in more detail below. In some instances, such other machines may include information kiosks, ATMs, or other unattended devices with which a consumer may interact. Throughout the disclosure vending machine(s) 10 may generally be referred to as kiosk(s). It should be noted that the vending machine 10 may also be connected to the network N and may also be connected to the management server 300 via the mobile terminal 200. In addition, the vending machine 10 and the management server 300 may also be directly connected by means of P2P communication or the like, and may be connected via the network N.

The mobile terminals 200A-200C are computers able to connect to the vending machine 10 via the network N. Specific examples of the mobile terminal 200 which may be cited include a mobile telephone or a smartphone, a personal computer (PC), a personal digital assistant (PDA), a tablet or a wearable terminal. This mode of embodiment describes an example in which the mobile terminal 200 is a smartphone that has a wireless communication function and is installed with a connection application (also referred to below as a "connection app") for connecting to the vending machine 10.

The management server 300 is a computer connected to the network N, and a PC or a server device, etc., may be cited as an example thereof.

The network N in the connection management system 1 is formed by a wireless network. Examples of the network N include a mobile telephone network, a personal handy-phone system (PHS) network, a wireless local area network (LAN), or a network based on 3rd generation (3G), long-term evolution (LTE), 4th generation (4G), WiMax (registered trademark), infrared communication, Bluetooth (registered trademark), or the like.

2. Configuration of the Management Server 300

2-1. Hardware Configuration of the Management Server 300.

Figure 2:
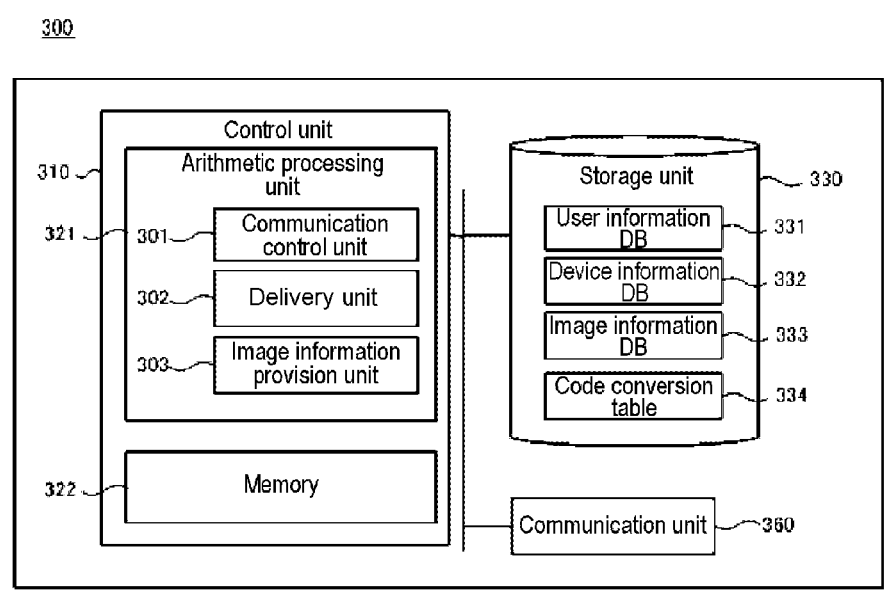
FIG. 2 is a block diagram of a management server according to a first mode of embodiment.

FIG. 2 is a block diagram illustrating an example of the configuration of the management server 300.

As illustrated in FIG. 2, the management server 300 comprises: a control unit 310, a storage unit 330, and a communication unit 360.

The control unit 310 is formed by an arithmetic processing unit 321, such as a CPU, and a memory 322, such as a random access memory (RAM). The arithmetic processing unit 321 causes operation of the various functional units by executing a program recorded in the storage unit 330, in accordance with various inputs. The memory 322 serves to temporarily store various kinds of data required for calculations, etc., while the processing for the program is being executed.

The storage unit 330 is a nonvolatile storage medium, such as a hard disk drive (HDD) or a flash memory, for example. The storage unit 330 stores an operating system and various programs for implementing the abovedescribed configuration. The storage unit 330 may also store data required for executing various programs. These programs and data are referenced from the arithmetic processing unit 321 as a result of being loaded in the memory 322, as required.

The communication unit 360 is configured in such a way as to connect the management server 300 to the network. For example, the communication unit 360 may be formed by a LAN card, an analog modem, an ISDN modem, etc., and an interface for connecting the above to a processing unit via a transmission path, such as a system bus.

It should be noted that in addition to the above described constituent elements, the management server 300 may also comprise a display device, such as a display, and an input device, such as a keyboard.

2-2. Functional Configuration of the Management Server 300

The functions of the management server 300 are described hereinbelow. As illustrated in FIG. 2, the arithmetic processing unit 321 of the management server 300 may include, as functional units, a communication control unit 301, a delivery unit 302, and an image information provision unit 303. Furthermore, the storage unit 330 may store a user information DB 331, a device information DB 332, an image information DB 333, and a code conversion table 334.

FIG. 3 illustrates an example of the user information DB 331. As illustrated in FIG. 3, user attribute information and purchase history, etc., are stored in association with a user ID for identifying a user, in the user information DB 331. The user attribute information includes the user age, gender, address, and occupation, for example. The management server 300 may acquire the user attribute information that is set when the user of the connection app installs the app, and can set the attribute information in the user information DB 331.

FIG. 4 illustrates an example of the device information DB 332. As illustrated in FIG. 4, installation location information and machine type are stored in association with a device ID in the device information DB 332. The device ID is information for identifying the vending machine 10. The installation location information is information indicating the location, where the corresponding vending machine 10 is installed, and may comprise latitude/longitude information or position information, such as an address, for example. The machine type is information indicating the type of vending machine 10 and indicates categories, such as canned juice vending machine, cup vending machine or dispenser, for example.

FIG. 5 illustrates an example of the image information DB 333. As illustrated in FIG. 5, a product code (an example of type information relating to the type of food/drink), region information, time information and user attribute information are stored in the image information DB 333 in association with an image information ID for identifying a product image.

As understood in the art, the product code is a code for identifying a product. The region information is information indicating the name of a predetermined administrative region or municipality, for which corresponding image information is provided. The time information is information indicating a predetermined time, for which corresponding image information is provided. By associating the region information and time information with an image information ID in the image information DB 333, the management server is able to provide a product image having any design, in accordance with the time or the region in which the vending machine 10 is installed.

FIG. 6 illustrates an example of the code conversion table 334. As illustrated in FIG. 6, a manager code (product code) and a company code are stored in association in the code conversion table 334. The manager code is a code which is used by a manager of the connection management system 1 to manage products. Meanwhile, the company code is a code that is used by a distributor of the products sold in the vending machine 10 to manage the products. By storing the code conversion table, the management server 300 is able to handle products by conversion to a corresponding manager code (product code) even if the product is managed by a company code in the vending machine 10.

Returning to FIG. 2, further functions of the management server 300 are described. The communication control unit 301 controls the communication unit 360 in order to communicate with the mobile terminal 200 and the vending machine 10. According to this mode of embodiment, the communication control unit 301 establishes a connection via the mobile terminal 200 connected to the vending machine 10 when communication is to be performed with said vending machine 10. As a result, the management server 300 can communicate with the vending machine 10 regardless of the wireless radio-wave intensity transmitted by the vending machine 10.

In addition, the communication control unit 301 may employ encrypted communication when communicating with the vending machine 10 via the wireless terminal 200. As a result, when the management server 300 communicates with the vending machine 10, it is possible to prevent interception of the communication from the mobile terminal 200 via which the communication is performed. Furthermore, the communication control unit 301 also may employ encrypted communication when communicating with the mobile terminal 200. As a result, it is possible to prevent interception of communication from another mobile terminal 200.

The delivery unit 302 delivers an extension application (also referred to below as an "extension app") to the mobile terminal 200 in accordance with a request for delivery of the extension application sent from the mobile terminal. The extension app is an application for adding a predetermined function to the connection app. Specifically, by installing the extension app in the mobile terminal 200, it is possible, from the mobile terminal 200, to select a product for purchase from the vending machine 10 and to designate the size of the product, whether or not supplements are added to the product (e.g., sugar and cream, etc.), and the amount of such supplements. Various different kinds of extension apps may be prepared in accordance with the machine type of the vending machine 10 (categories, such as canned beverage vending machine, dispenser, cupped beverage vending machine).

The information that can be designated using the extension app for each machine type is as follows, for example.

Canned beverage vending machine
Product type (product code)
Cupped beverage vending machine Product type (product code), cup size, inclusion or otherwise of supplements (e.g., inclusion or otherwise of sugar and cream, etc.), amount of supplements Dispenser
Product type (product code), amount of products to be mixed, inclusion or otherwise of supplements, amount of supplements According to this mode of embodiment, the delivery unit 302 delivers to the mobile terminal 200 the type of extension app specified in the delivery request from the mobile terminal 200.

The image information provision unit 303 sends image information for a product to the mobile terminal 200. For example, the image information provision unit 303 receives from the mobile terminal 200 the device identification information, product code and status information, and can select the image information which is sent to the mobile terminal 200. The device identification information includes a device ID and machine type information for the vending machine 10, for example. The status information includes information relating to the cost of the product, the categories of "hot" or "cold", and information relating to whether or not the product can be sold, such as "sold out", "please wait", "on sale" and "out of order", for example.

The image information provision unit 303 extracts from the product code acquired from the mobile terminal 200 the product code corresponding to a product for which the status information is "on sale." In addition, the image information provision unit 303 refers to the device information DB 332 in order to extract installation location information of the corresponding vending machine 10 from the device ID included in the device identification information. The image information provision unit 303 then refers to the image information DB 333 in order to extract the image information corresponding to the extracted installation location information and product code. The image information provision unit 303 sends the extracted image information to the mobile terminal 200. Furthermore, the image information provision unit 303 is also able to send image information commensurate with the corresponding time to the mobile terminal 200, based on the current date and time.

The image information provision unit 303 according to this mode of embodiment can thus vary the image information provided in accordance with the time and the installation location of the vending machine 10. As a result, it is possible to easily vary the package design of the product provided according to the region and time.

In addition, the image information provision unit 303 may attach to the image information sent to the mobile terminal 200 information relating to an order of priority for designating the order of products displayed, when a product designation screen to be described later (an example of a food/drink designation screen) is displayed on the mobile terminal 200 (this information is also referred to below as "priority information").

The priority information may set in accordance with a purchase history stored in the user information DB 331. Specifically, the higher the frequency with which the user of the mobile terminal 200 purchases a product, the higher the order of priority which can be set by the image information provision unit 303. Furthermore, the image information provision unit 303 may also set a high order of priority for a product which the manager of the vending machine 10 wishes to sell, for example.

3. Configuration of the Mobile Terminal 200
3-1. Hardware Configuration of the Mobile Terminal 200

Figure 7:
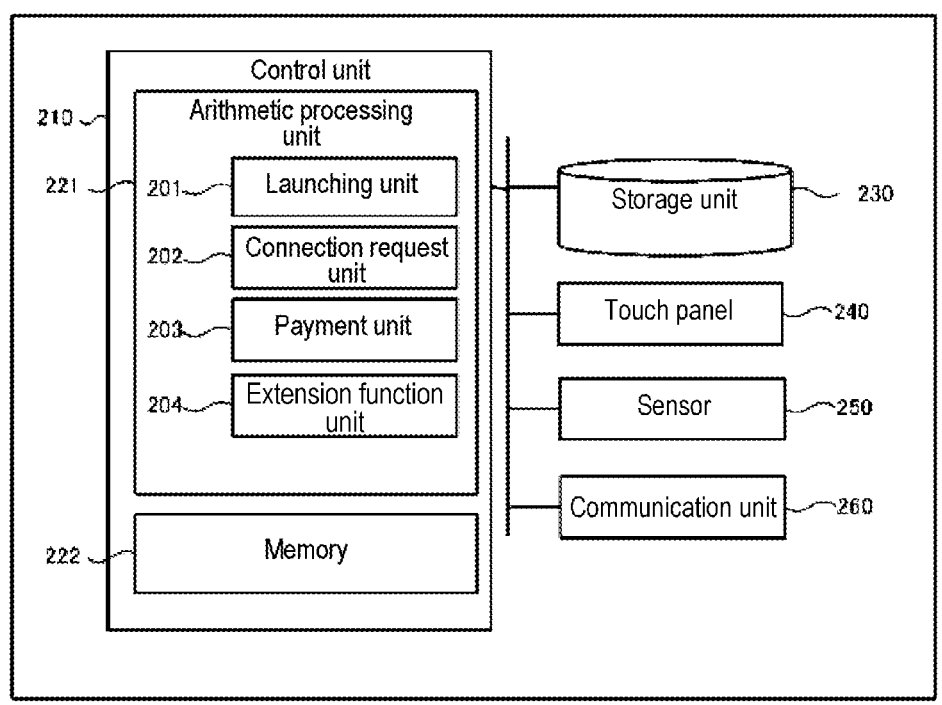
FIG. 7 is a block diagram of a mobile terminal according to a first mode of embodiment.

FIG. 7 is a block diagram illustrating an example of the configuration of the mobile terminal 200.

As illustrated in FIG. 7, the mobile terminal 200 comprises: a control unit 210, a storage unit 230, a touch panel 240, a sensor 250, and a communication unit 260.

The control unit 210 is formed by an arithmetic processing unit 221, such as a CPU or MPU, and a memory 222, such as a random access memory (RAM). The arithmetic processing unit 221 causes operation of the various functional units by executing a program stored in the storage unit 230 in accordance with various inputs. The memory 222 serves to temporarily store various kinds of data required for calculations, etc., while the processing of the program is being executed.

The storage unit 230 is a nonvolatile storage medium, such as a hard disk drive (HDD) or flash memory, for example. The storage unit 230 stores an operating system and various programs for implementing the abovedescribed configuration. The storage unit 230 may also store data required for executing various programs. These programs and data are referenced from the arithmetic processing unit 221 as a result of being loaded in the memory 222, as required.

Various types of data required for operating the connection app are further stored in the storage unit 230. For example, the storage unit 230 stores correspondences between the extension app and the device identification information, the total number of points, a product purchase history, terminal information constituting an identifier of the mobile terminal 200, and various settings relating to the connection app.

Points may be awarded to the user in accordance with the cost of products purchased. For example, if the total number of points reaches a predetermined value, the points may be exchanged for a product or the user may be subscribed to a campaign. The product purchase history may include, for example, product codes for products purchased, date and time of purchase, device ID of the vending machine 10 from which a purchase was made, points added at the time of purchase, and identifiers for whether the product purchased was "hot" or "cold". Additional and/or alternative product purchase history data may also be collected and stored.

The terminal information of the mobile terminal 200 refers, for example, to the ID and telephone number, and to any digits or characters, symbols or combinations thereof. It should be noted that the terminal information of the mobile terminal 200 may also be preset by the user.

The various settings relating to the connection app refer to information that can be set with respect to the connection app. The various settings relating to the connection app are settings, such as user attribute information and favorite products, for example.

The touch panel 240 is a device for receiving user input and for displaying various types of information. It should be noted that the device for receiving user input and the device for displaying the various types of information are not limited to an integrated configuration, such as the touch panel 240. For example, the device for receiving user input may be a keyboard or mouse, various kinds of sensor, or a wearable device, etc. Furthermore, the device for displaying the various types of information may be a liquid crystal display or an organic electroluminescent (EL) display, or a wearable device display, etc. Furthermore, these devices may be configured externally to the mobile terminal 200, and may be connected to said mobile terminal 200 via a universal serial bus (USB) or a display cable, etc.

The sensor 250 is a motion sensor for detecting acceleration in the horizontal and vertical directions of the mobile terminal 200. It should be noted that the sensor 250 may be formed using existing technology.

The communication unit 260 is configured in such a way as to connect the mobile terminal 200 to the network. The communication unit 260 may send/receive wireless signals in accordance with Bluetooth or wireless LAN standards, etc. For example, the communication unit 260 may be formed by a LAN card, an analog modem, an ISDN modem, etc., and an interface for connecting the above to a processing unit via a transmission path, such as a system bus. Furthermore, the communication unit 260 may relay encrypted communication between the management server 300 and the vending machine 10.

3-2. Functional Configuration of the Mobile Terminal 200

The function of the mobile terminal 200 in which the connection app is installed be described next. As illustrated in FIG. 7, the arithmetic processing unit 221 comprises, as functional units, a launching unit 201, a connection request unit 202, an extension function unit (examples of which include a reception unit, image acquisition unit, display control unit, purchase processing unit, designation unit and obtainment unit) 204, and a payment unit 203.

3-2-1. Launching Unit 201

The launching unit 201 causes the touch panel 240 to display a launch notification prompting launching of the connection app when the mobile terminal 200 has received a first wireless signal to be described later. The launching unit 201 may cause the touch panel 240 to display the launch notification using a function of the operating system (OS) of the mobile terminal 200. The launch notification includes a pop-up displayed on the touch panel 240, a predetermined notification sound, or an email, etc. Furthermore, the launching unit 201 may also automatically cause the connection app to be launched when the first wireless signal has been received. It should be noted that the launching unit 201 may determine whether or not the connection app is in the process of being launched by the mobile terminal 200 when the first wireless signal is received, and if launching is in progress, the launch notification is not given.

3-2-2. Connection Request Unit 202

The connection request unit 202 sends/receives a wireless signal by controlling the communication unit 260. Specifically, when the mobile terminal 200 receives a second wireless signal to be described later from the vending machine 10 and the field intensity of the second wireless signal is equal to or greater than a threshold, the connection request unit 202 sends a connection request signal by controlling the communication unit 260 on receiving a user operation. The connection request signal may include terminal information, such as an identifier or telephone number of the sending mobile terminal 200.

When the mobile terminal 200 receives second wireless signals from a plurality of vending machines 10, the connection request unit 202 controls the communication unit 260 in such a way as to send a connection request signal to the vending machine 10 sending the second wireless signal with the highest field intensity. The connection request unit 202 is able to select a vending machine 10 located close to the mobile terminal 200 as the destination of the connection request signal by selecting the destination of the connection request signal in accordance with the field intensity. The connection request unit 202 then determines whether or not a connection request signal can be sent in accordance with whether or not the field intensity of the second wireless signal sent by the vending machine 10 selected as a destination is equal to or greater than a predetermined threshold. As a result, the connection request unit 202 is able to allow transmission of a connection request signal only when the mobile terminal 200 is within a predetermined distance of the selected vending machine 10. It should be noted that the connection request unit 202 may adjust the threshold of the field intensity in accordance with the situation of the mobile terminal 200.

According to this mode of embodiment, the user operation is an operation to impart an impact or vibration to the mobile terminal 200 by tapping said mobile terminal 200. In addition to direct tapping of the mobile terminal 200, the user operation also includes imparting vibration by tapping the mobile terminal 200 from over a pocket or bag in which the mobile terminal 200 is housed. The vibration imparted to the mobile terminal 200 is detected by means of a sensor 280. When the sensor 280 detects vibration, the connection request unit 202 determines that a user operation has been received, and controls the communication unit 260 in order to send a connection request signal.

It should be noted that the user operation is not limited to tapping of the mobile terminal 200. For example, the user operation includes an operation to push a predetermined button on the mobile terminal 200, an operation to briefly touch the screen, an operation to input a predetermined command, a voice input operation, and an operation to shake the mobile terminal, among others. In addition, the connection request unit 202 may equally have a configuration in which a connection request signal is automatically sent when the second wireless signal has been received.

According to this mode of embodiment, the connection request unit 202 was described in terms of an exemplary configuration in which the connection request signal is continuously sent for a predetermined time to the communication unit 260, but this is not limiting and the connection request unit 202 may equally have a configuration in which the connection request signal is sent at a predetermined period to the communication unit 260 or a configuration in which the connection request signal is sent only once.

In addition, if a user operation has not been received even after a predetermined time has elapsed since transmission of the second wireless signal, the connection request unit 202 may change the vending machine 10 to which the connection request signal is sent, in accordance with the field intensity of a second wireless signal which has once again been received.

Furthermore, the connection request unit 202 may cancel a connection established between the vending machine 10 and the mobile terminal 200, in accordance with a user operation.

When a connection between the vending machine 10 and the mobile terminal 200 is established, the connection request unit 202 sends terminal information and authentication information for the mobile terminal 200 by encrypted communication with the vending machine 10.

3-2-3. Extension Function Unit 204

The extension function unit 204 performs extension app installation processing and dispensing designation processing.

(A) Extension App Installation Processing

The extension function unit 204 acquires device identification information from the vending machine 10 when encrypted communication with the vending machine 10 is established by means of the connection request unit 202. The device identification information is information including the device ID and machine type information, etc., of the vending machine 10, as described above. The extension function unit 204 requests from the management server 300 delivery of the extension app corresponding to the acquired device identification information, in accordance with the correspondence between the extension app and the device identification information, stored in the storage unit 230. Specifically, the extension function unit 204 may select the extension app matching the machine type information included in the acquired device identification information.

It should be noted that if the extension app handled by the extension function unit 204 is already installed in the mobile terminal 200, a configuration may be adopted such that the delivery request is not made to the management server 300. The extension function unit 204 executes installation processing for the extension app when the extension app is acquired from the management server 300.

(B) Dispensing Designation Processing

The extension function unit 204 performs dispensing designation processing using the function of the extension app installed in the mobile terminal 200. As a result of the extension app being installed in the mobile terminal 200, the extension function unit 204 is able to send information designating a product in accordance with the machine type of the vending machine 10.

Specifically, the extension function unit 204 first of all acquires from the vending machine 10 the product codes of products which can be sold, and status information for each type of product. As indicated above, the status information includes information relating to the cost of the product, the categories of "hot" or "cold", and information relating to whether or not the product can be sold, such as "sold out", "please wait", "on sale" and "out of order", for example. The extension function unit 204 sends to the management server 300 the device identification information, the acquired product code and status information for each type of product, and acquires image information for each product from the management server 300.

The extension function unit 204 uses the acquired image information in order to create a product designation screen commensurate with the machine type of the vending machine 10. An example of the functions realized on the product designation screen created for each machine type of the vending machine 10 is as follows.

Canned beverage vending machine

Designation of product type (product code)

Cupped beverage vending machine

Designation of product type (product code), designation of cup size, designation of inclusion or otherwise of supplements (e.g., inclusion or otherwise of sugar and cream, etc.), designation of amount of supplements Dispenser Designation of product type (product code), designation of amount of products to be mixed, designation of inclusion or otherwise of supplements, designation of amount of supplements The extension function unit 204 may control the display order of the products displayed on the product designation screen in accordance with priority information set by the image information provision unit 303. In addition, the extension function unit 204 may also control the display order in accordance with information relating to a favorite product preregistered by the user in the connection app.

Figure 8:
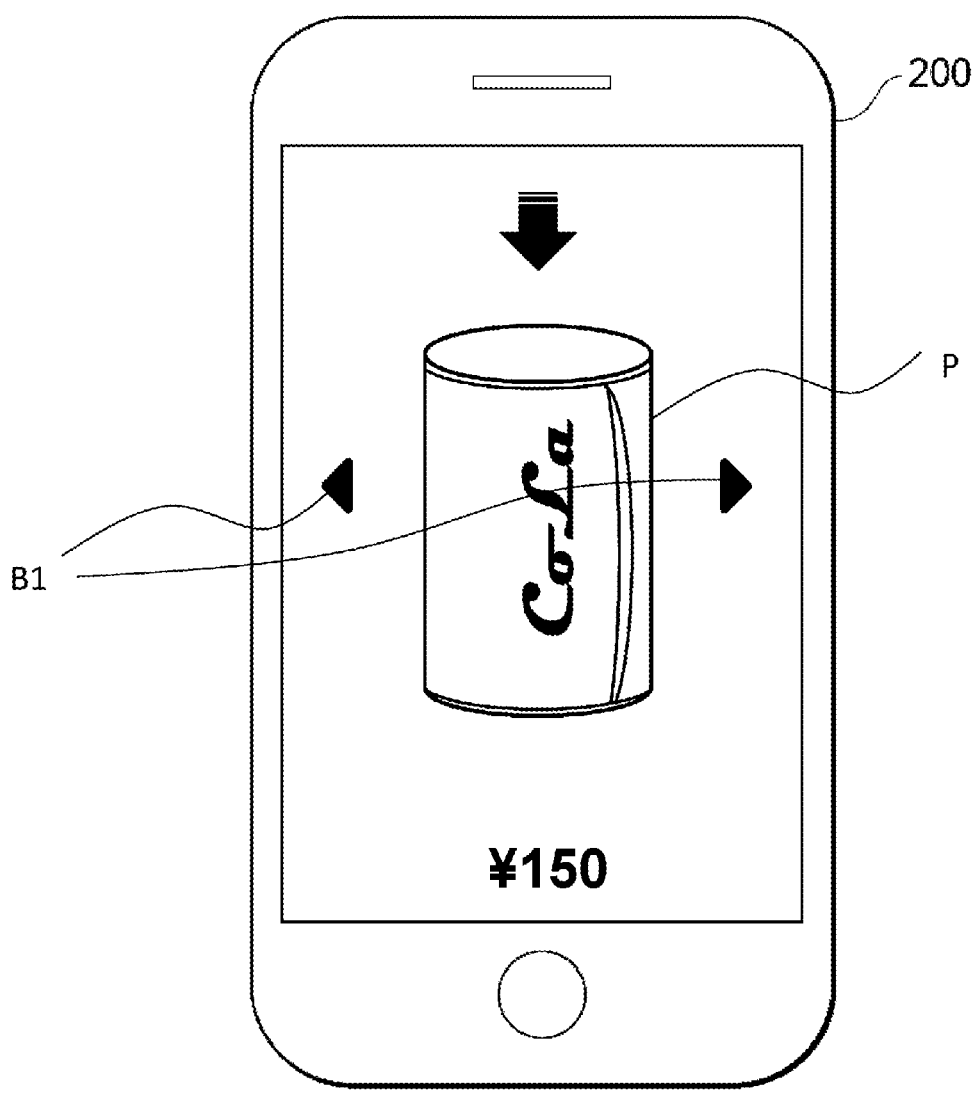
FIG. 8 illustrates an example of a product designation screen according to a first mode of embodiment.
Figure 9:
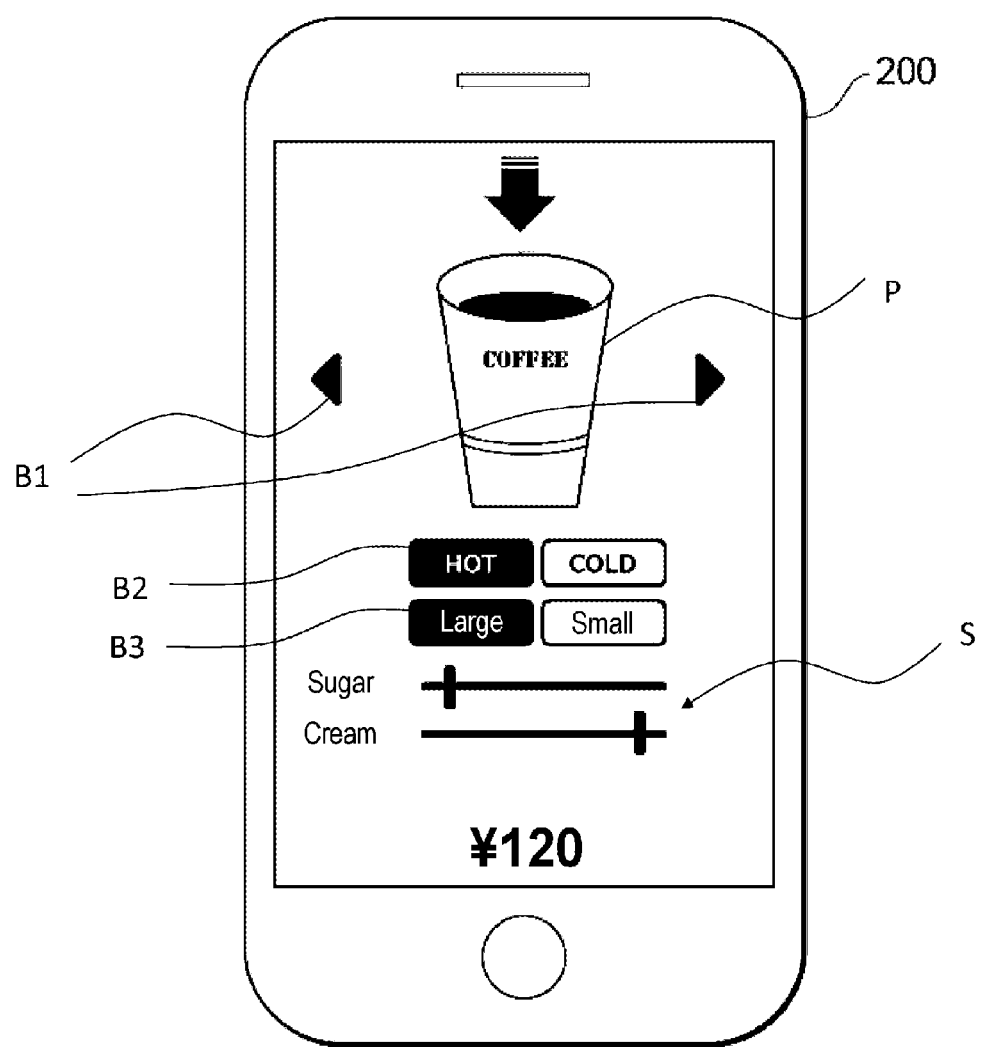
FIG. 9 illustrates an example of a product designation screen according to a first mode of embodiment.

FIG. 8 and FIG. 9 illustrate an example of the product designation screen created by the extension function unit 204 according to this mode of embodiment and displayed on the touch panel 240. FIG. 8 illustrates the product designation screen when the machine type is a canned beverage vending machine, and FIG. 9 illustrates the product designation screen when the machine type is a cupped beverage vending machine.

The product designation screen illustrated in FIG. 8 comprises a product image P and product change buttons B1. When the user swipes the product image P downward on the product designation screen, the extension function unit 204 sends dispensing designation information to the vending machine 10. In this case, the dispensing designation information includes the product code of the selected product.

The product designation screen illustrated in FIG. 9 comprises: a product image P, product change buttons B1, hot/cold selection buttons B2, cup size selection buttons B3, and supplement amount adjustment sliders S. The supplement amount adjustment sliders S are sliders for adjusting the amount of sugar and cream in the product designation screen illustrated in FIG. 9. If the sliders S are moved to the left-hand end, it is possible to select non-inclusion of the supplements. When the product designation screen illustrated in FIG. 9 is used, the dispensing designation information sent by the extension function unit 204 includes, in addition to the product code, the categories of hot and cold, and information relating to cup size, inclusion or otherwise of supplements and the amount of supplements.

When the dispensing designation information sent using the product designation screens in FIG. 8 and FIG. 9 has been received by the vending machine 10, the extension function unit 204 may control the display in such a way that the product image P displayed on the product designation screen disappears from the screen. With the extension function unit 204 according to this mode of embodiment, the product is dispensed from the vending machine 10 in response to a downward swiping operation on the product designation screen. As a result, the user can sense that the product is being dispensed from the vending machine 10 in response to a downward swiping operation by a finger, so the user can more readily and intuitively feel that the product has been purchased. It should be noted that the direction of the swiping operation is not limited to downward, and an upward swipe on the screen or a left/right swipe on the screen is equally feasible.

On the other hand, if the dispensing designation information is rejected by the vending machine 10 for reasons of the vending machine being out of order or not ready, for example, the extension function unit 204 may control the display in such a way that the product image P remains on the product designation screen. In an embodiment, the extension function unit 204 causes a display indicating rejection by superimposing a cross symbol or similar on the product image P remaining on the product designation screen.

In addition, in the case of products for which the information relating to whether or not the product can be sold in the status information is not "on sale", the extension function unit 204 may also control the display in such a way that the product image does not move on the product designation screen.

3-2-4. Payment Unit 203

When a purchase completion signal to be described later is received from the vending machine 10 by the communication unit 260, the payment unit 203 executes point addition processing in accordance with the price of the product included in the purchase completion signal and information relating to points. For the point addition processing, the payment unit 203 may add points from the current occasion to the total number of points by referring to the storage unit 230, for example.

4. Configuration of the Vending Machine 10

4-1. Hardware Configuration of the Vending Machine 10

The configuration of the vending machine 10 according to this mode of embodiment will be described with reference to FIG. 10 and FIG. 11.

Figure 10:
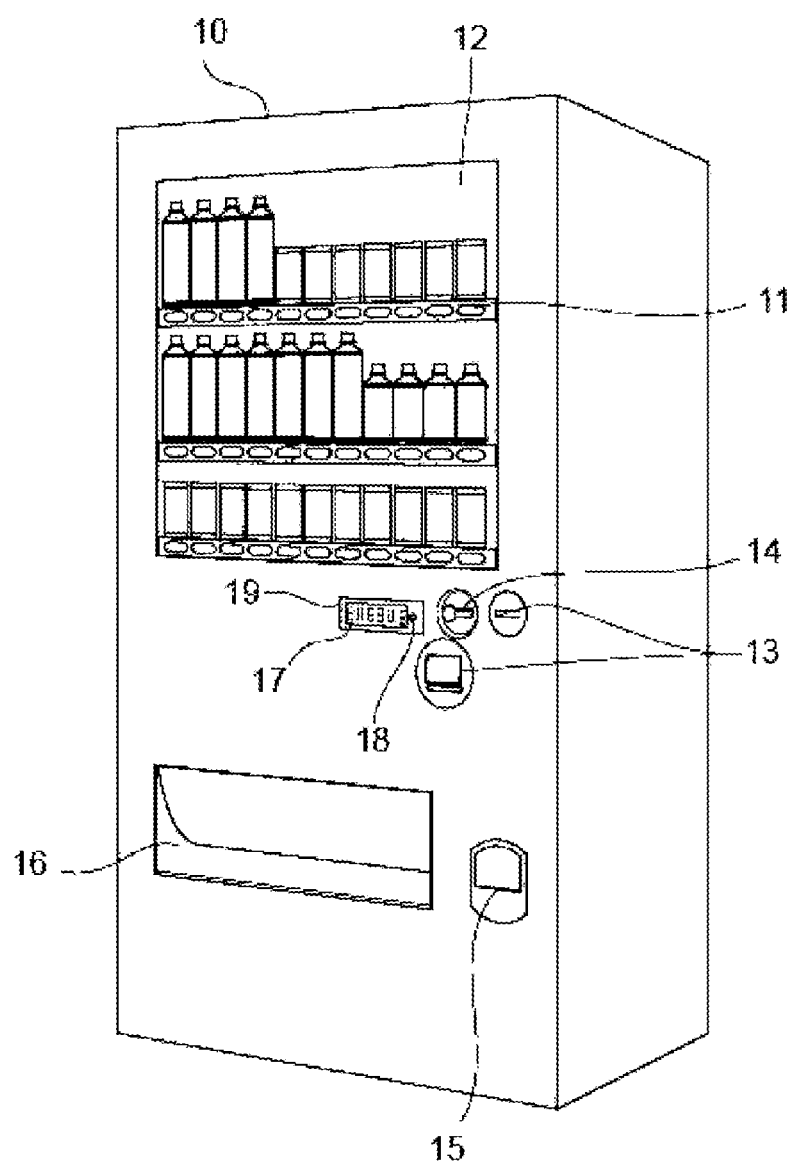
FIG. 10 is a configuration diagram of a vending machine according to a first mode of embodiment.

FIG. 10 is an oblique view illustrating an example of the hardware configuration of the vending machine 10. The vending machine 10 may include: product selection buttons 11; a product sample display section 12; payment receiving sections 13; a return lever 14; a change return opening 15; a product retrieval opening 16; a display unit 17; a human sensor 18 (an example of the detection unit); and a wireless communication unit 19 (an example of the transmission unit and connection unit).

The product sample display section 12 is provided at the upper part of the front surface of the vending machine 10, and samples of products sold by the vending machine 10 are displayed therein. It should be noted that the product sample display section 12 may be a liquid-crystal display or a panel displaying product photographs or images. In addition, the vending machine 10 according to this mode of embodiment may equally have a configuration that does not include a product sample display section 12.

The product selection buttons 11 are provided below the samples of products displayed in the product sample display section 12, where the product selection buttons 11 are configured to receive a product selection from a user. It should be noted that the vending machine 10 according to this mode of embodiment may equally have a configuration that does not include the product selection buttons 11.

In an embodiment, the payment receiving sections 13 are provided below the product sample display section 12. The payment receiving sections 13 comprise, for example, a coin slot, a banknote insertion slit, and a reader, or any combination thereof. The reader includes a reader for electronic money afforded by a contactless IC card or a mobile telephone, for example.

The return lever 14 is provided below the product sample display section 12 and returns change from the change return opening 15 in accordance with a user operation. In addition, according to this mode of embodiment, when the return lever 14 is twisted by a user while a connection has been established between the vending machine 10 and the mobile terminal 200, the return lever 14 sends to the wireless communication unit 19 a signal canceling the connection established between the vending machine 10 and the mobile terminal 200.

The change return opening 15 is provided below the payment receiving sections 13 and change is returned thereby.

The product retrieval opening 16 is provided at the lower part of the front surface of the vending machine 10; where a product selected by the user using the product selection buttons 11 is dispensed therefrom.

The wireless communication unit 19 is provided between the product sample display section 12 and the payment receiving sections 13, for example, and sends/receives wireless signals. The wireless communication unit 19 refers to a device able to send/receive wireless signals, such as Bluetooth® or wireless LAN, by means of a broadcast or unicast.

In addition, the wireless communication unit 19 may send a plurality of different wireless signals. For example, the wireless communication unit 19 may send different types of wireless signals (Wi-Fi®, Bluetooth®, wireless LAN, etc.) and wireless signals having different transmission powers. According to this mode of embodiment, the wireless communication unit 19 is able to adjust the transmission power by controlling a wireless control unit 103, which is described later herein. Specifically, the wireless communication unit 19 adjusts the transmission power of radio waves sent, whereby it is possible to send a Bluetooth signal having a range of approximately 30 m (also referred to below as the "first wireless signal"), and a Bluetooth® signal having a range of approximately 3 m (also referred to below as the "second wireless signal"). The first wireless signal may include product advertisement and campaign information, for example. Furthermore, the second wireless signal may include the device ID of the vending machine 10 sending said second wireless signal.

It should be noted that the first wireless signal and the second wireless signal are not limited to signals based on the same communication standard, and the first and second wireless signal may be signals based on different communication standards.

In addition, the wireless communication unit 19 is configured in such a way as to receive the connection request signal and a purchase instruction signal. As described above, the connection request signal is a signal that can be sent by the mobile terminal 200 that receives the second wireless signal. The wireless communication unit 19 can therefore receive only a connection request signal sent from a mobile terminal 200 positioned within the range of the second wireless signal from the vending machine 10.

According to this mode of embodiment, the display unit 17 is attached to the wireless communication unit 19 and displays the monetary amount of the product selected by the user using the product selection buttons 11 or by operation of the mobile terminal 200. Furthermore, the display unit 17 is able to display identification information of the mobile terminal 200 included in the connection request signal, by controlling a specification unit 104 which is described later herein.

According to this mode of embodiment, the human sensor 18 is provided in the wireless communication unit 19 and detects a person in the vicinity of the vending machine 10. The human sensor 18 is a 24-GHz Doppler sensor or the like, for example Specifically, the human sensor 18 detects a person positioned within any range of the vending machine 10, or detects a person by detecting an object (e.g., clothing or accessories, etc.) on the person. It should be noted that the detectable range of the human sensor 18 may be preset by the manager of the connection management system 1.

In addition, the human sensor 18 may detect the approach of a person. In this case, the human sensor 18 is able to detect the action of a user approaching the vending machine 10 in order to retrieve a product from the product retrieval opening 16. Furthermore, the human sensor 18 is also able to detect a person remaining for a predetermined time within a predetermined range of the vending machine 10.

It should be noted that the human sensor 18 is not limited to a Doppler sensor provided that it is able to detect a person in the vicinity of the vending machine 10. For example, the human sensor 18 may be a camera or an infrared sensor. Furthermore, the position at which the human sensor 18 is attached is not limited to the wireless communication unit 19 and it may be attached at any position on the vending machine 10, and is may be attached to the front surface of the vending machine 10. By providing the human sensor 18 on the front surface of the vending machine 10, it is possible to prevent erroneous detection of a person close to an adjacent vending machine 10 when a plurality of vending machines 10 stand adjacent to one another.

A product housing section for housing products, a dispensing mechanism for dispensing a product to the product retrieval opening 16, and a control device for controlling the vending machine 10 are further provided inside said vending machine 10, although these are not depicted in FIG. 10.

4-2. Functional Configuration of the Vending Machine 10

Figure 11:
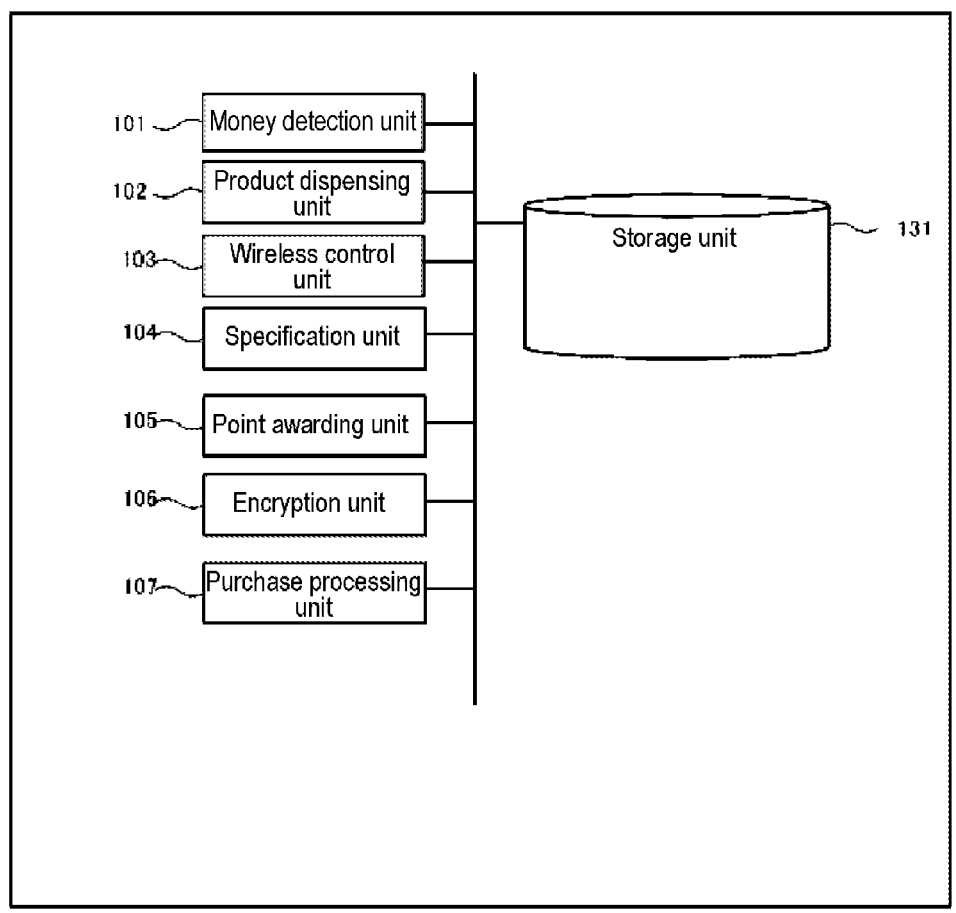
FIG. 11 is a functional block diagram of a vending machine according to a first mode of embodiment.

FIG. 11 is a block diagram illustrating an example of the functional configuration of the vending machine 10. The vending machine 10 according to this mode of embodiment comprises: a money detection unit 101, a product dispensing unit (determination unit and an example of a dispensing unit) 102, a wireless control unit 103, the specification unit 104, an encryption unit 106, a purchase processing unit 107, a point awarding unit 105 and a storage unit 131. If the vending machine 10 is a dispenser, such as a beverage or fountain dispenser, then the vending machine 10 may include a user interface (not shown) with selectable options for pouring and/or blending beverages or foods. Moreover, sensors, such as pour sensors that measure amount of fluid poured, temperature sensors, remaining ingredients (e.g., micro or macro ingredients) sensors, and other sensors may be included in the vending machine 10.

4-2-1. Money Detection Unit 101

The money detection unit 101 detects that money for a product has been paid. When the money received by the payment receiving section 13 is an actual banknote, the money detection unit 101 detects whether or not said money is genuine, and if the money inserted is genuine, calculates the total thereof. Meanwhile, if the payment receiving section 13 has received electronic money, the money detection unit 101 deducts the cost of the selected product from the electronic money. It should be noted that the money detection unit 101 may be realized using existing technology.

4-2-2. Product Dispensing Unit 102

The product dispensing unit 102 determines whether or not the product selected in accordance with the dispensing designation information can be dispensed when the wireless communication unit 19 has received dispensing designation information sent from the mobile terminal 200. If the selected product can be dispensed, the product dispensing unit 102 controls the dispensing mechanism in accordance with the selected product and the money received by the payment receiving section 13. On the other hand, if dispensing is not possible, the wireless communication unit 19 is controlled so as to send a rejection signal to the mobile terminal 200. It should be noted that the product dispensing unit 102 may also receive a product selection by means of the product selection buttons 11. When it is detected by the money detection unit 101 that money equal to or greater than the value of the selected product has been inserted, the product dispensing unit 102 controls the dispensing mechanism in order to dispense the selected product to the product retrieval opening 16. Furthermore, when the money inserted is equal to or greater than the value of the selected product, the product dispensing unit 102 returns change from the change return opening 15 or from the banknote insertion slit.

4-2-3. Wireless Control Unit 103

When the human sensor 18 has detected that a person is in a position within a predetermined range of the vending machine 10 (also referred to below as "ON"), the wireless control unit 103 sends a wireless signal by controlling the wireless communication unit 19. Specifically, the wireless control unit 103 is continuously sending the first wireless signal, and when the human sensor 18 is ON, the wireless control unit 103 controls the transmission power in the wireless communication unit 19 in such a way that the first wireless signal and the second wireless signal are sent alternately at a predetermined period. It should be noted that the wireless control unit 103 may equally have a configuration for performing control in such a way that the wireless signal sent by the wireless communication unit 19 during an ON period and an OFF period is switched from the first wireless signal to the second wireless signal.

The wireless control unit 103 according to this mode of embodiment thus controls the wireless communication unit 19 in such a way that the second wireless signal is sent only when the human sensor 18 is ON. As a result, it is possible to limit the mobile terminal 200 able to receive the second wireless signal to a mobile terminal 200 in proximity to the vending machine 10.

4-2-4. Specification Unit 104

The specification unit 104 specifies, in accordance with the connection request signal, the mobile terminal 200 connecting to the vending machine 10, and establishes a connection with the mobile terminal 200 specified. For example, the specification unit 104 specifies the mobile terminal 200 establishing a connection with the vending machine 10, in accordance with the order in which connection request signals have been received by the wireless communication unit 19. Specifically, when connection request signals have been received from a plurality of mobile terminals 200, the specification unit 104 specifies the mobile terminal 200 from which a connection request signal was first received as the mobile terminal connecting to the vending machine 10. As a result, when connection request signals are received from a plurality of mobile terminals 200, the specification unit 104 is able to select, as the partnering connection, a mobile terminal 200 located in proximity in accordance with the vending machine 10.

Furthermore, the specification unit 104 may specify the mobile terminal 200 connecting to the vending machine 10 in accordance with the field intensity of the connection request signal, for example. In this case, the specification unit 104 specifies, from among the plurality of mobile terminals 200, a mobile terminal 200 sending a connection request signal having a high field intensity, as the mobile terminal 200 connecting to the vending machine 10.

In addition, the specification unit 104 may control the display unit 17 in such a way as to display the identification information of the mobile terminal 200 specified. As a result, the user is able to visually confirm whether or not the mobile terminal 200 connected to the vending machine 10 from which the user is attempting to purchase a product is his or her own mobile terminal.

4-2-5. Encryption Unit 106

The encryption unit 106 controls the wireless communication unit 19 in order to provide encrypted communication between the mobile terminal 200 and the management server 300.

(A) Encrypted Communication Processing With the Mobile Terminal 200

The encryption unit 106 acquires the terminal information and authentication information from the connected mobile terminal 200 when the specification unit 104 establishes a connection with the mobile terminal 200. The authentication information constitutes a certificate used for communication, such as secure sockets layer (SSL), for example. The encryption unit 106 establishes encrypted communication with the mobile terminal 200 in accordance with the acquired authentication information. Furthermore, the encryption unit 106 disconnects the encrypted communication with the mobile terminal 200 when a purchase completion signal is sent by means of the point awarding unit 105 which is described later herein.

(B) Encrypted Communication Processing With the Management Server 300

The encryption unit 106 performs encrypted communication with the management server 300. Here, the encryption unit 106 may communicate with the management server 300 via the mobile terminal 200. The encryption unit 106 communicates with the management server 300 via the mobile terminal 200, and as a result it is possible to communicate with the management server 300 regardless of the radiowave intensity of the wireless communication unit 19.

4-2-6. Purchase Processing Unit 107

The purchase processing unit 107 controls the wireless communication unit 19 in order to send and receive data required for purchasing a product to and from the mobile terminal 200 and the management server 300.

(A) Data Sent to the Mobile Terminal 200

The data sent to the mobile terminal 200 as a result of the purchase processing unit 107 controlling the wireless communication unit 19 is as follows.

Device identification information

Product code of products able to be sold

Status information for each type of product

The status information for each type of product is information showing the status of products handled by the vending machine 10. As described above, the status information includes information relating to the cost of the product, the categories of "hot" or "cold", and information relating to whether or not the product can be sold, such as "sold out", "please wait", "on sale" and "out of order", for example. It should be noted that there may be a plurality of product costs, for each payment method. To be more specific, the cost when payment is made in cash and the cost when payment is made in electronic money may be different. By including information relating to a plurality of costs in the status information, it is possible to vary the cost for specific electronic money only, for which there is a campaign, such as a discount, without altering the cost for other payment methods during such a campaign for electronic money, for example.

The purchase processing unit 107 may further be configured to receive and process beverage fluid/food dispensing metrics, such as fluid ounces, ingredient(s), beverage type, food type, etc. in the event that the vending machine is a dispenser, such as a beverage fountain dispenser 10D. It should be understood that rather than the purchase processing unit 107 performing functionality for both purchases and dispenses, that a separate processing unit may be used to support dispenses (B) Data Received From the Mobile Terminal 200

The data received from the mobile terminal 200 as a result of the purchase processing unit 107 controlling the wireless communication unit 19 is as follows.

Dispensing designation information

When the wireless communication unit 19 receives the dispensing designation information as a result of control of the purchase processing unit 107, dispensing processing is executed by the product dispensing unit 102.

(C) Data Sent to the Management Server 300

Terminal information of the mobile terminal 200

When the extension app is installed in the mobile terminal 200, the purchase processing unit 107 sends terminal information of the mobile terminal 200 to the management server via the mobile terminal 200. The management server 300 having received the terminal information can send to the vending machine 10 attribute information of the corresponding user by referring to the user information DB 331, for example.

4-2-7. Point Awarding Unit 105

When the product dispensing unit 102 dispenses a product, the point awarding unit 105 controls the wireless communication unit 19 so that a purchase completion signal is sent to the mobile terminal 200 currently connected to the vending machine 10, and the management server 300. The purchase completion signal includes: the product code for the product purchased, the date and time of purchase, the device ID of the vending machine 10 from which the product was purchased, points added at the time of purchase, and an identifier for "hot" or "cold" in regard to the product purchased, for example. Additional and/or alternative parameters may be included in the purchase completion signal.

4-2-8. Storage Unit 131

The storage unit 131 stores data required for the functional units of the vending machine 10 to implement processing. For example, the product code of the product, cost, and points awarded are stored in association in the storage unit 131. Device identification information of the vending machine 10 is furthermore stored in the storage unit 131, for example.

5. Processing Flow 5-1. Processing for Specifying a Mobile Terminal for Connection from a Plurality of Mobile Terminals 200

Figure 12:
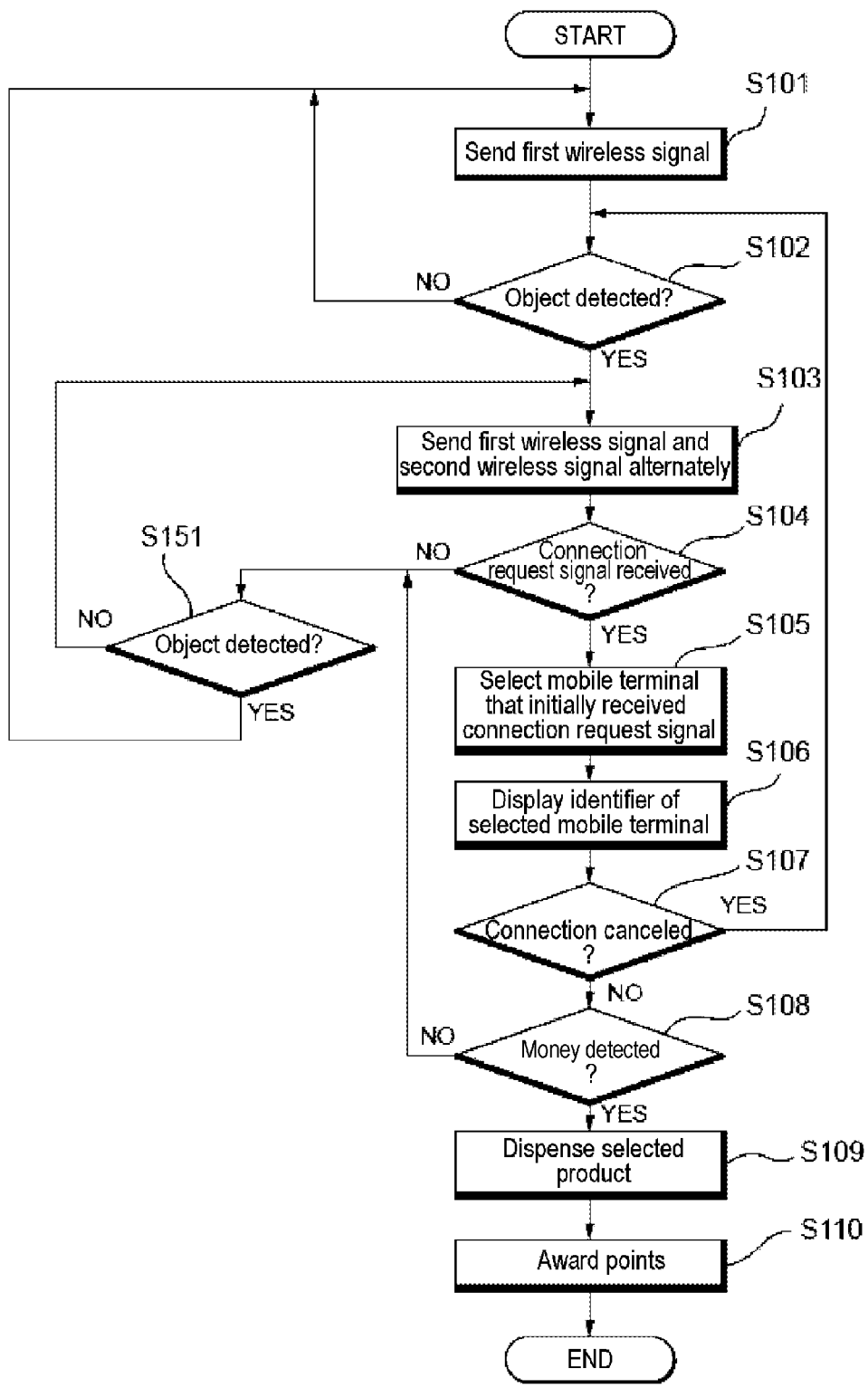
FIG. 12 illustrates an example of the processing flow in a vending machine according to a first mode of embodiment.

FIG. 12 is a flowchart illustrating an example of the processing flow when the vending machine 10A specifies the mobile terminal 200A, from among the plurality of mobile terminals 200, which is owned by a user (also referred to below as the "user A") purchasing a product from said vending machine 10A. FIG. 12 illustrates an example in which a mobile terminal 200B (the user owning the mobile terminal 200B is referred to as the user B) is present within the range of the second wireless signal from the vending machine 10A.

The wireless communication unit 19 of the vending machine 10A continuously sends the first wireless signal (S101). When the user A is close to the vending machine 10A and the human sensor 18 of the vending machine 10A is ON (S102: YES), then the wireless control unit 103 controls the wireless communication 19 so as to send the first wireless signal and the second wireless signal alternately (S103).

If a predetermined time has elapsed (S151: YES) without the wireless communication unit 19 having received the connection request signal (S104: NO), then the wireless control unit 103 can control the wireless communication unit 19 in such a way as to stop transmission of the second wireless signal.

If the wireless communication unit 19 has received a plurality of connection request signals (S104: YES) then the specification unit 104 specifies that the mobile terminal that sent the connection request signal first received is the mobile terminal closest to the vending machine 10A, and causes a connection to be established with that mobile terminal (S105). For example, if the user B in proximity to the vending machine 10A causes the mobile terminal 200B to send a connection request signal in order to unfairly take the points of user A or the like, then the wireless communication unit 19 may receive a plurality of connection request signals.

The specification unit 104 causes the display unit 17 to display the terminal information of the mobile terminal with which a connection has been established (S106). The user A visually confirms the terminal information displayed on the display unit 17, and if the terminal information is not the terminal information of the user's own mobile terminal 200A, then the user can cancel the connection by twisting the return lever 14. This makes it possible to prevent another user from unfairly taking points by virtue of the fact that the display unit 17 displays the terminal information of the mobile terminal 200 currently connected.

On the other hand, if the terminal information displayed on the display unit 17 is the terminal information of the mobile terminal 200A, then the user A selects a product using the product selection buttons 11 and inserts the money for the product into the money receiving section 13 in order to purchase the product. It should be noted that when a connection between the mobile terminal 200A and the vending machine 10A has been established, the user A can still cancel the connection if he or she wishes to cancel purchase of the product, even if the mobile terminal 200A is operated (S107).

If the money detection unit 101 of the vending machine 10A detects money commensurate with the cost of the product (S108: YES), then the product dispensing unit 102 dispenses the selected product to the product retrieval opening 16 (S109). It should be noted that the product dispensing unit 102 may also dispense the product if an automatic deduction flag contained in the connection request signal has been detected.

When the product is dispensed to the product retrieval opening 16, the point awarding unit 105 sends a purchase completion signal to the mobile terminal 200A (S110).

The vending machine 10A according to this mode of embodiment thus sends the second wireless signal having a short range only when the human sensor 18 is ON. As a result, it is possible to limit the mobile terminals 200 able to send a connection request signal to a mobile terminal in proximity to the vending machine 10.

5-2. Processing for Specifying a Vending Machine for Connection From a Plurality of the Vending Machines 10

Figure 13:
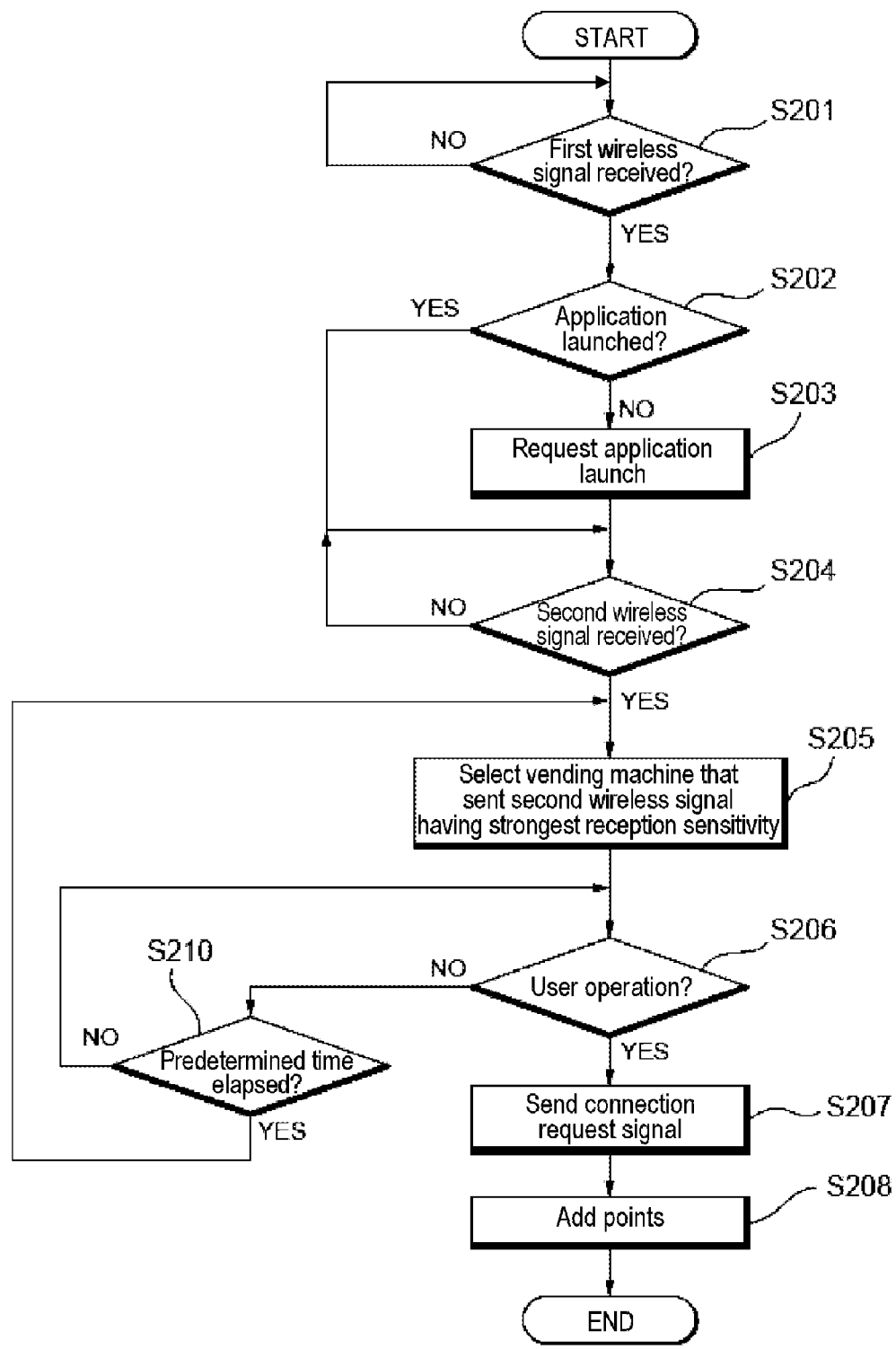
FIG. 13 illustrates an example of the processing flow in a mobile terminal according to a first mode of embodiment.

A description is provided with regard to FIG. 13 of the processing flow for processing in which the mobile terminal 200A specifies a vending machine 10A from which the user A is purchasing a product, from among a plurality of the vending machines 10.

If the mobile terminal 200A receives the first wireless signal (S201: YES) while the user A is moving toward the vending machine 10A, the launching unit 201 determines whether or not the connection app has been launched. If the connection app has still not been launched in the mobile terminal 200A (S202: NO), the launching unit 201 displays a launch notification for the connection app on the touch panel 240 requesting launching of the connection app (S203). It should be noted that in this case the launching unit 201 may automatically launch the connection app.

Meanwhile, if the connection app has already been launched in the mobile terminal 200A (S202: YES), then the launching unit 201 does not provide a launch notification.

When the user A approaches the vending machine 10A and the human sensor 18 of the vending machine 10A is ON, the second wireless signal is sent from the vending machine 10A. When the communication unit 260 of the mobile terminal 200A receives the second wireless signal (S204: YES), the connection request unit 202 selects as the connection destination the vending machine sending the second wireless signal with the strongest reception sensitivity in the communication unit 260 (S205). For example, if the user A approaches the vending machine 10A when the vending machine 10B is disposed adjacent to the vending machine 10A, then the human sensor may also be turned ON in the vending machine 10B. Furthermore, there may also be times when the human sensor 18 in the vending machine 10B is turned ON as a result of a separate user B approaching the vending machine 10B at the same time as the user A approaches the vending machine 10A. In such cases, the connection request unit 202 selects the vending machine 10 which sent the second wireless signal having the strongest reception sensitivity, and it is possible as a result to specify the vending machine 10 in proximity according to the user A. In addition, the connection request unit 202 determines whether or not the field intensity of the second wireless signal sent by the vending machine 10A is equal to or greater than a predetermined threshold. If the field intensity is equal to or greater than the predetermined threshold, the connection request unit 202 determines that the mobile terminal 200A is within a predetermined distance of the vending machine 10A and is able to send a connection request signal.

In an embodiment, in order to purchase the product from the vending machine 10A, the user A taps the mobile terminal 200A and imparts vibration thereto in order to establish a connection with the vending machine 10A. When the sensor 250 in the mobile terminal 200A detects this vibration (S206: YES) in a state in which the communication unit 260 is receiving the second wireless signal, then the connection request unit 202 sends a connection request signal to the vending machine 10A (S207).

The terminal information of the mobile terminal 200A may be displayed on the display unit 17 of the vending machine 10A that has received the connection request signal. The user is able to visually confirm that the terminal information is that of the mobile terminal 200A. If the terminal information displayed on the display unit 17 is the terminal information of the mobile terminal 200A, a product may be selected using the product selection buttons 11 and the money for the product is inserted into the payment receiving section 13 in order to purchase the product.

When a purchase completion notification is received from the vending machine 10A, the payment unit 203 implements the abovedescribed point addition processing (S208).

The mobile terminal 200 according to this mode of embodiment can thus send a connection request signal when the second wireless signal is received. As a result, it is possible to limit the vending machine 10 receiving the connection request signal to a vending machine 10 located in proximity to the mobile terminal 200. The connection management system 1 according to this mode of embodiment therefore makes it possible to specify a combination of a plurality of vending machines 10 and a plurality of mobile terminals 200 on a one-to-one basis.

In the event that the process provided in FIG. 13 is associated with dispenser 10D, then rather than a purchase completion notification being received from the dispenser 10D, a product dispensed completion notification may be communicated. In an embodiment, the product dispensed completion notification may include product dispensed data, such as ingredients/flavors and/or beverage type, amount of dispensed fluid, and so forth, may be communicated from the dispenser 10D to the mobile terminal 200A, for example. The product dispensed data may be used for determining and adding points at the point addition processing (S208).

5-3. Purchase Processing

Figure 14:
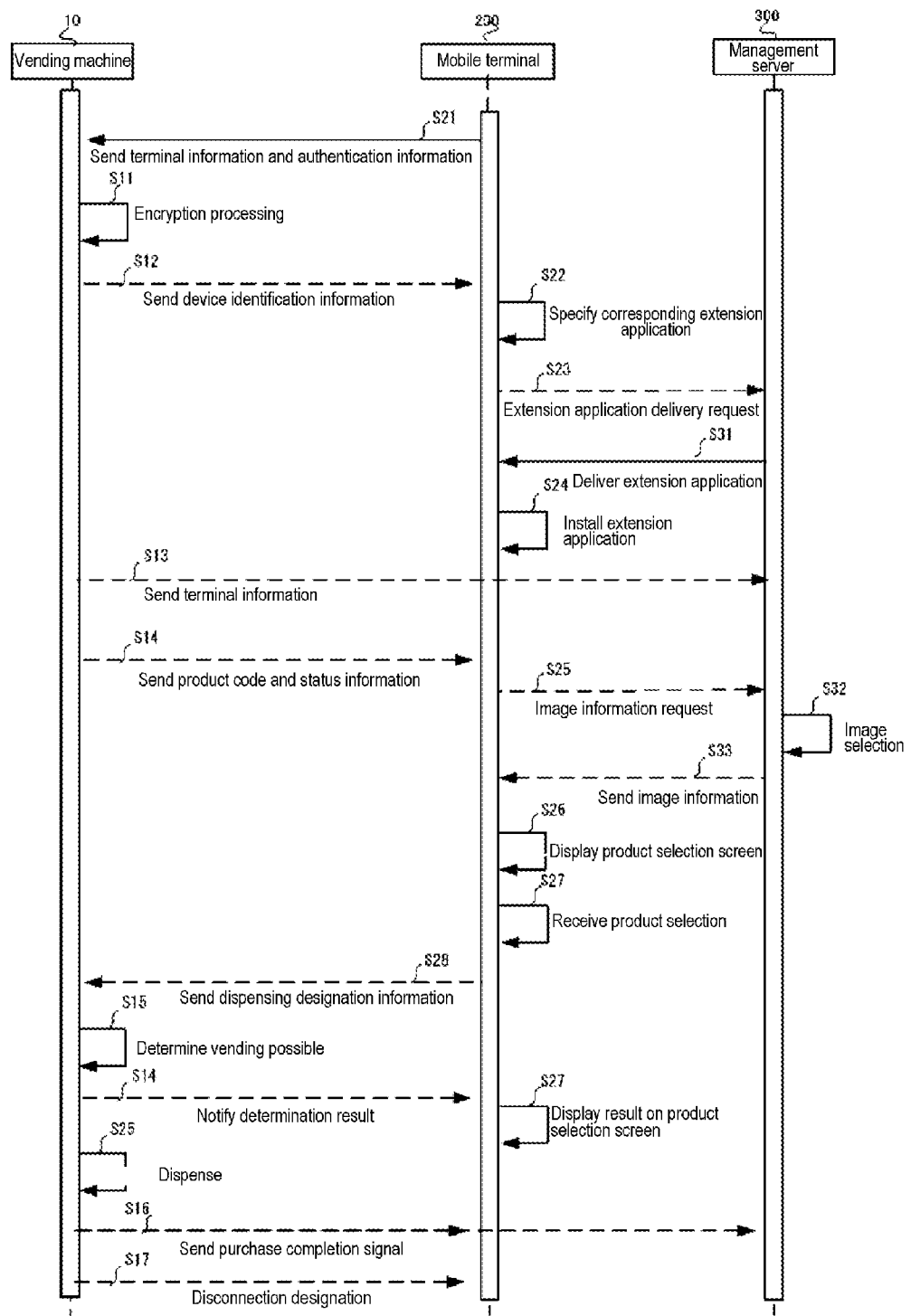
FIG. 14 illustrates an example of the processing sequence in a connection management system according to a first mode of embodiment.

The processing flow for purchase of a product when the connection management system 1 according to this mode of embodiment is utilized will be described next with the aid of FIG. 14. FIG. 14 is a sequence diagram for the connection management system 1 according to this mode of embodiment, after a connection has been established between the vending machine 10 and the mobile terminal 200 in accordance with the processing illustrated in FIG. 12 and FIG. 13. It should be noted that the arrows depicted by a broken line in FIG. 14 indicate encrypted communication.

When a connection of the vending machine 10 and the mobile terminal 200 is established, the connection request unit 202 of the mobile terminal 200 sends the terminal information and authentication information to the vending machine 10 (S21). The encryption unit 106 of the vending machine 10 encrypts the communication using the acquired terminal information and authentication information (S11). When the communication between the mobile terminal 200 and the vending machine 10 is encrypted, the purchase processing unit 107 sends device identification information for the vending machine 10 to the mobile terminal 200 (S12).

When the extension function unit 204 of the mobile terminal 200 acquires the device identification information, it specifies a corresponding extension app in accordance with the correspondence between the device identification information and the relevant extension app (S22). The extension function unit 204 then sends an app delivery request to the management server 300 (S23). The delivery unit 302 of the management server 300 delivers the requested extension app to the mobile terminal 200 (S31). The extension function unit 204 of the mobile terminal 200 that has acquired the extension app installs said extension app in order to add the function thereof to the connection (S24).

When the installation of the extension app has been completed in the mobile terminal 200, the purchase processing unit 107 of the vending machine 10 sends the terminal information of the mobile terminal 200 to the management server 300 via the mobile terminal 200 (S13). The management server 300 that has received the terminal information is able to send to the vending machine 10 attribute information of the corresponding user by referring to the user information DB 331, for example.

The purchase processing unit 107 of the vending machine 10 then sends to the mobile terminal 200 the product codes of products able to be sold and status information for each type of product (S14). The extension function unit 204 of the mobile terminal 200 sends to the management server 300 the acquired product codes and status information and requests transmission of image information (S25). The image information provision unit 303 of the management server 300 references the image information DB 333 and selects the acquired device identification information and image information for which the status information corresponds to codes of products which are "on sale" (S32), and sends said information to the mobile terminal 200 in conjunction with priority information (S33).

The extension function unit 204 of the mobile terminal 200 which has acquired the image information creates the product designation screen which is displayed on the touch panel 240 (S26). At this point, the extension function unit 204 controls the display order of the products in accordance with the priority information. If the user performs a swipe operation with respect to a product image displayed on the product designation screen, for any product, the extension function unit 204 receives selection of the product (S27). The extension function unit 204 sends the dispensing designation information to the vending machine 10 for the selected product (S28).

When the dispensing designation information is received by the vending machine 10, the product dispensing unit 102 determines whether or not the product selected in the dispensing designation information can be dispensed (S15). The determination result is sent from the wireless communication unit 19 to the mobile terminal 200 by means of the purchase processing unit 107 (S16). The example described here relates to a case in which it is determined that the product can be dispensed.

In the event that the process being performed by the vending machine 10 is being performed by a dispenser, such as dispenser 10D, then rather than a purchase completion signal being communicated by the vending machine 10, a product dispensed signal may be communicated. In an embodiment, the product dispensed signal may include product dispensed data, such as ingredients/flavors and/or beverage type, amount of dispensed fluid, and so forth, may be communicated from the vending machine 10 to the mobile terminal 200 and/or management server 300 (S16), for example. The purchase processing unit 107 may receive the and process the product dispensed data, and, in turn, notify the point awarding unit 105 thereof. In an embodiment, the product dispensed data may be used for determining and adding points by the point awarding unit 105 or other unit.

In an embodiment, the purchase processing unit 107 may further be configured to receive product orders from the mobile terminal 200 that is executing a mobile app that supports the user selecting a product, such as a particular beverage or beverage blend, to be wirelessly ordered from the mobile terminal 200 to the dispenser 10D, for example. For example, a user using the mobile terminal 200 may select a beverage and/or blend to be dispensed, and the mobile terminal 200 may communicate with the dispenser 10D. The dispenser 10D may receive the order, optionally display the order in association with a user ID of the user, and enable the user to select the optionally displayed order (e.g., via a soft-button) for dispensing therefrom. In an embodiment, the purchase processing unit 107 may be configured to process the order in response to being dispensed, and the point awarding unit 105 may award points to the user for the ordered beverage based on amount of beverage dispensed, for example. It should be understood that other vending machines may be configured to support remote orders via mobile terminals 200. The communications between the mobile terminal 200 and vending machines 10 may be direct via a local communications protocol or indirect via a networked server, for example. In an embodiment, the mobile app may also be configured as a payment processor or communicate a payment request to a POS or otherwise. The payment may alternative be made by the mobile terminal 200 using a mobile wallet via the money detection unit 101 of the vending machines 10, as understood in the art.

The extension function unit 204 of the mobile terminal 200 displays the determination result on the product designation screen (S27). Specifically, the extension function unit 204 deletes the selected product from the product designation screen.

When the user inserts money into the payment receiving section 13 of the vending machine 10, the product dispensing unit 102 performs dispensing processing (S25). When the dispensing processing has been completed, the point awarding unit 105 sends a purchase completion signal to the mobile terminal 200 and to the management server 300 (S16). When transmission of the purchase completion signal has been completed, the encryption unit 106 disconnects the encrypted communication (S17).

By virtue of the connection management system 1 according to this mode of embodiment, a product to be purchased can thus be selected by means of the mobile terminal 200 connected to the vending machine 10. Furthermore, it is possible to extend suitable functions in the mobile terminal 200 in accordance with the machine type of the vending machine 10 to which the mobile terminal 200 is connected. Changes to product package design and pricing, etc. can be made more flexible as a result.

Other Modes of Embodiment

The mode of embodiment described above is intended to facilitate an understanding of the present invention but should not be interpreted as restricting the present invention. The present invention may be modified/improved without departing from the essential point thereof, and equivalents are also included in the present invention. Furthermore, the modes of embodiment are given by way of example and it goes without saying that parts of the configuration illustrated in the different modes of embodiment may be substituted or combined, and any such variations are also included within the scope of the present invention provided that the features of the present invention are included.

For example, the mode of embodiment given above describes a configuration in which the mobile terminal 200 downloads the extension app from the management server 300, but this is not limiting. For example, the extension function unit 204 of the mobile terminal 200 may be configured to download the extension app directly. In this case, the extension function unit 204 is able to send a delivery request for the extension app to the vending machine 10 when encrypted communication with the vending machine 10 is established.

Furthermore, the mode of embodiment given above describes a configuration in which the user pays the money for the product after having selected the product to be dispensed, but this is not limiting. For example, it is possible to adopt a configuration in which the user pays the money while selecting the product after a connection has been established. In this case, the connection request signal sent by the mobile terminal 200 may comprise an automatic deduction flag and a product code, for example. The automatic deduction flag refers to a flag for indicating whether or not an automatic deduction is to be used for purchasing the product. For example, the user can preset in the connection app whether or not automatic deductions should be used. Existing technology may be used for automatic deductions, such as a withdrawal from an account or credit card payment, or a prepaid payment system. Furthermore, the product code is a code for a product being purchased which is preset by the user in the connection app. By presetting a product in the connection app, the user can purchase the desired product without operating the vending machine 10. It should be noted that the connection request unit 202 may also automatically set the product code of a product purchased with high frequency in the connection app, in accordance with the product purchase history.

In addition, the product dispensing unit 102 is able to dispense the selected product to the product retrieval opening 16 when the wireless communication unit 19 has received a connection request signal for which an automatic deduction flag has been set. Furthermore, when the connection request signal includes an automatic deduction flag, the specification unit 104 may be configured in such a way that the terminal information for the mobile terminal 200 connected is displayed on the display unit 17 in accordance with the connection request signal received, after which a fixed standby period is provided. In this case, if the connection is not canceled as a result of the return lever 14 being twisted within the fixed period, etc., the product dispensing unit 102 can then dispense the product.

KEY TO SYMBOLS

1 . . . Connection management system
10A-10D . . . Vending machine and/or dispenser
11 . . . Product selection button
12 . . . Product sample display section
13 . . . Payment receiving section
14 . . . Return lever
15 . . . Change return opening
16 . . . Product retrieval opening
17 . . . Display unit
18 . . . Human sensor
19 . . . Wireless communication unit
101 . . . Money detection unit
102 . . . Product dispensing unit
103 . . . Wireless control unit
104 . . . Specification unit
105 . . . Point awarding unit
106 . . . Encryption unit
107 . . . Purchase processing unit
131 . . . Storage unit
200A-200C . . . Mobile terminal
201 . . . Launching unit
202 . . . Connection request unit
203 . . . Payment unit
204 . . . Extension function unit
230 . . . Storage unit
300 . . . Management server The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A food/drink dispensing device that manages a connection with a mobile terminal, said device comprising:
a connection unit for specifying a mobile terminal to connect with and for establishing a connection with the specified mobile terminal;
a transmission unit for sending, from the food/drink dispensing device to the mobile terminal, device identification information for identifying the food/drink dispensing device, the device identification information causing the mobile terminal to request and install an extension application on the mobile terminal corresponding to the food/drink dispensing device, the mobile terminal receiving the extension application from a management server, and the transmission unit further sending, to the mobile terminal, responsive to installation of the extension application, type information relating to a plurality of types of food/drink handled by the food/drink dispensing device, and product and status information relating to the food/drink handled by the food/drink dispensing device;

a purchase processing unit for receiving, from the mobile terminal, a selection of food/drink from a user via a food/drink designation screen including displayed image information acquired from the management server, the image information acquired from the management server based on the product and status information sent from the mobile terminal to the management server, the image information of the food/drink corresponding to the product and status information relating to each item of food/drink;

a determination unit for determining whether, based on the status information, the food/drink selected can be dispensed, when dispensing designation information including type information relating to the type of food/drink selected has been received from the mobile terminal; and a dispensing unit for dispensing said food/drink when dispensing of said food/drink is possible.

2. The food/drink dispensing device as claimed in claim 1, wherein the dispensing designation information further includes information relating to the size of the food/drink dispensed and supplements added to the food/drink dispensed.

3. The device according to claim 1, wherein the transmission unit of the food/drink dispensing device is further configured to send, to the mobile terminal, status information including at least one of (i) cost and (ii) information relating to whether or not the food/drink can be sold.

4. The device according to claim 3, wherein information relating to whether or not the food/drink can be sold includes at least one of "sold out," "please wait," "on sale," and "out of order".

5. The device according to claim 1, wherein the transmission unit is further configured to send data indicative of machine type of the device to cause the mobile terminal to display different food/drink images based on the machine type.

6. The device according to claim 1, further comprising:
a purchase processing unit for receiving a selection of the selected food/drink, wherein the selection includes one of a "hot" or "cold" selection for the selected food/drink;
wherein the dispensing unit dispenses said food/drink according to the "hot" or "cold" selection.

7. The device according to claim 1, wherein the mobile terminal further receives, from the management server, priority information relating to a priority of the food/drink that causes the mobile terminal to display information relating to a plurality of available food/drink items according to the priority information received from the food/drink dispensing device via the reception unit, wherein the priority information is determined based on a purchase history of a user of the mobile terminal.

8. The device according to claim 7, wherein the purchase history includes frequency data indicating a frequency in which the user purchases the food/drink, and wherein the priority of the food/drink displayed on the mobile terminal changes based on the frequency.

9. The device according to claim 8, wherein the priority of the food/drink displayed on the mobile terminal increases as the frequency increases.

10. The device according to claim 7, further comprising a user information database configured to store purchase history information related to the user, wherein the user information database is updated as the user purchases the food/drink, and wherein the priority of the food/drink relative to other items of food/drink displayed on the mobile terminal of the user changes based on changes to the user information database.

11. The device according to claim 1, wherein the mobile terminal further receives, from the management server, priority information relating to a priority of the food/drink that causes the mobile terminal to display information relating to a plurality of available food/drink items according to the priority information received from the food/drink dispensing device via the reception unit, wherein the priority information is determined based on data received from a computing device associated with the dispensing unit that sets the priority of the food/drink.

12. A mobile terminal that connects to a food/drink dispensing device for dispensing food/drink, said mobile terminal comprising:
a communication unit for establishing a connection with the food/drink dispensing device;
a connection request unit for sending a connection request signal by controlling the communication unit;
a reception unit for receiving,
from the food/drink dispensing device, device identification information for identifying the food/drink dispensing device, and
from a management server, an extension application for installation on the mobile terminal corresponding to the food/drink dispensing device, the management server identifying the extension application based on the device identification information for the food/drink dispensing device, the mobile terminal further receiving, from the food/drink dispensing device responsive to installation of the extension application, product and status information relating to the food/drink handled by the food/drink dispensing device;
an image information acquisition unit for sending the product and status information to the management server for managing the food/drink dispensing device and for acquiring, from the management server, image information of the food/drink corresponding to the product and status information relating to each item of food/drink, the image information received from the management server being identified based on terminal information for the mobile terminal;
a display control unit for displaying, in accordance with the image information acquired, a food/drink designation screen for receiving a selection of food/drink from a user; and
a designation unit for sending to the food/drink dispensing device type information of the selected food/drink, in accordance with the image information selected by the user on the food/drink designation screen.

13. The mobile terminal as claimed in claim 12, wherein said mobile terminal is configured to download and install the extension application corresponding to the device identification information, when said extension application is not installed.

14. The mobile terminal as claimed in claim 12, wherein the display control unit receives a swipe operation from a user with respect to the displayed image information, on the food/drink designation screen, and the designation unit sends to the food/drink dispensing device type information of the food/drink corresponding to the image information which has been subjected to a swipe operation.

15. The mobile terminal as claimed in claim 12, wherein, when the management server has sent an order of priority in association with a plurality of image information items based on the priority of the food/drink, the display control unit controls the display order of the image information in accordance with the order of priority.

16. The mobile terminal as claimed in claim 12, wherein the communication unit encrypts and relays communication between the food/drink dispensing device and the management server.

17. The mobile terminal according to claim 12, wherein the selection received from the user via the food/drink designation screen includes one of a "hot" or "cold" selection for the food/drink, and wherein the designation unit sends to the food/drink dispensing device information corresponding to the "hot" or "cold" selection for the selected food/drink.

18. A program for executing a predetermined function in a mobile terminal which connects to a food/drink dispensing device for dispensing food/drink, wherein said program causes the mobile terminal to function as:

a communication unit for establishing a connection with the food/drink dispensing device;

a connection request unit for sending a connection request signal by controlling the communication unit;

a reception unit for receiving, from the food/drink dispensing device, device identification information of the food/drink dispensing device, and from a management server, an extension application for installation on the mobile terminal corresponding to the food/drink dispensing device, the management server identifying the extension application based on the device identification information for the food/drink dispensing device, the mobile terminal further receiving, from the food/drink dispensing device responsive to installation of the extension application, product information relating to the food/drink handled by the food/drink dispensing device, type information relating to the food/drink, and status information relating to the food/drink;

an image information acquisition unit for sending the device identification information, the type information, and the status information to a management server for managing the food/drink dispensing device, and for acquiring, from the management server, image information of the food/drink corresponding to the type information;

a display control unit for displaying, in accordance with the image information acquired, a food/drink designation screen for receiving selected food/drink from a user; and a designation unit for sending to the food/drink dispensing device type information of the selected food/drink, in accordance with the image information selected by the user on the food/drink designation screen.

19. The program according to claim 18, wherein the selection received from the user via the food/drink designation screen comprises one of a "hot" or "cold" selection for the food/drink, and wherein the designation unit sends to the food/drink dispensing device information corresponding to the "hot" or "cold" selection for the selected food/drink.

* * * * *